US012061572B2

(12) United States Patent
Ahmed et al.

(10) Patent No.: US 12,061,572 B2
(45) Date of Patent: Aug. 13, 2024

(54) DATA BLOCKING FOR APPLICATION PLATFORMS

(71) Applicant: SAP SE, Walldorf (DE)

(72) Inventors: Naved Ahmed, Bangalore (IN); Yasra Shakil, Bangalore (IN); Ashish Suri, Bangalore (IN)

(73) Assignee: SAP SE, Walldorf (DE)

( * ) Notice: Subject to any disclaimer, the term of this patent is extended or adjusted under 35 U.S.C. 154(b) by 42 days.

(21) Appl. No.: 17/679,937

(22) Filed: Feb. 24, 2022

(65) Prior Publication Data
US 2023/0267098 A1 Aug. 24, 2023

(51) Int. Cl.
*G06F 16/11* (2019.01)

(52) U.S. Cl.
CPC .......... *G06F 16/125* (2019.01); *G06F 16/113* (2019.01)

(58) Field of Classification Search
CPC .............................. G06F 16/125; G06F 16/113
See application file for complete search history.

(56) References Cited

U.S. PATENT DOCUMENTS

| | | | |
|---|---|---|---|
| 7,392,421 B1* | 6/2008 | Bloomstein | G06F 11/2028 714/4.4 |
| 2006/0064456 A1* | 3/2006 | Kalthoff | H04L 67/1095 709/201 |
| 2014/0032600 A1* | 1/2014 | Sarferaz | G06F 16/00 707/E17.005 |
| 2014/0109238 A1* | 4/2014 | Ravindran | G06Q 10/0635 726/27 |
| 2017/0091479 A1* | 3/2017 | Pluder | G06F 21/6245 |
| 2019/0108246 A1* | 4/2019 | Jois | G06F 16/113 |
| 2022/0303888 A1* | 9/2022 | Wyld | H04W 76/14 |

* cited by examiner

*Primary Examiner* — Brittany N Allen
*Assistant Examiner* — William P Bartlett
(74) *Attorney, Agent, or Firm* — SCHWEGMAN LUNDBERG & WOESSNER, P.A.

(57) ABSTRACT

Systems, methods, and computer-readable media are disclosed for data blocking for application platforms are disclosed. An application platform may comprise a plurality of systems. A system may store data having a residence period. Upon expiration of the residence period, the data may be blocked from further processing. The plurality of systems may comprise multiple leading systems. Each leading system may have at least one dependent system. The plurality of systems may be grouped into system groups comprising a leading system and at least one dependent system. Data blocking may be triggered from the leading system to the dependent systems for each system group. An interim blocking mode for determining which systems have data that need to be blocked, and an overall blocking mode for performing the data blocking may be provided.

19 Claims, 6 Drawing Sheets

DATA BLOCKING FOR APPLICATION PLATFORMS

TECHNICAL FIELD

Embodiments generally relate to methods of electronic data handling for application platforms. More specifically, embodiments relate to blocking data for application platforms having multiple leading systems using systems groups.

RELATED ART

Data privacy and protection has become an important issue for providers of electronic data systems over recent years. Recently enacted laws, such as the European Union's General Data Protection Regulation, mandate that electronic data processors provide data blocking of personal data after the expiration of a data residence period. When data is blocked, it is unavailable for further processing and inaccessible to most users. Blocked data may be stored for a further period of time and used for auditing purposes. Thereafter, the blocked data is to be electronically erased in its entirety from digital storage media. Failure to comply with these requirements can result in extensive negative consequences for electronic data processors.

Typical methods of blocking data in application platforms are limited to blocking data for a single leading system having multiple dependent systems. However, application platforms are often structured with multiple leading systems, and there may not be a clearly defined hierarchical structure between systems in the application platform. For example, a first leading system may have a first dependent system wherein the first dependent system comprises a second leading system. The second leading system may also have a second dependent system. When blocking data for multiple leading systems landscapes, all leading systems and dependent systems should be evaluated for data blocking. Accordingly, a need exists for a data blocking in application platforms having multiple leading systems.

SUMMARY

Disclosed embodiments address the above-mentioned problems of data blocking with multiple leading systems by organizing systems into system groups. A blocking request to block data in an application platform may be received from a user. The application platform may comprise a plurality of systems. After receiving the blocking request, the plurality of systems may be grouped into system groups. Each system group may comprise a leading system and zero or more dependent systems. Systems may be present in multiple system groups and, a system may be a leading system in a first system group and a dependent system in a second system group. For each system in a system group, it may be determined whether a residence period for the system has expired. If the residence period has expired, the data for the system may be blocked. The residence period may be a defined time period after which the system's data is to be blocked from further processing. The blocking process may be triggered from the leading system to the dependents systems within a system group.

Embodiments are directed to one or more non-transitory computer-readable media storing computer-executable instructions that, when executed by a processor, perform a method for data blocking for application platforms, comprising: receiving, from a user, a blocking request to block data in an application platform, the application platform comprising a plurality of systems, responsive to receiving the blocking request, grouping the plurality of systems into at least one system group, determining, for each system in the at least one system group, if a residence period has expired, and responsive to determining the residence period has expired, blocking the data for the system. Each system of the plurality of systems may be associated with at least one electronic master data entity.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present teachings will be apparent from the following detailed description of the embodiments and the accompanying drawing figures.

BRIEF DESCRIPTION OF THE DRAWING FIGURES

Embodiments are described in detail below with reference to the attached drawing figures, wherein.

Figure 1:
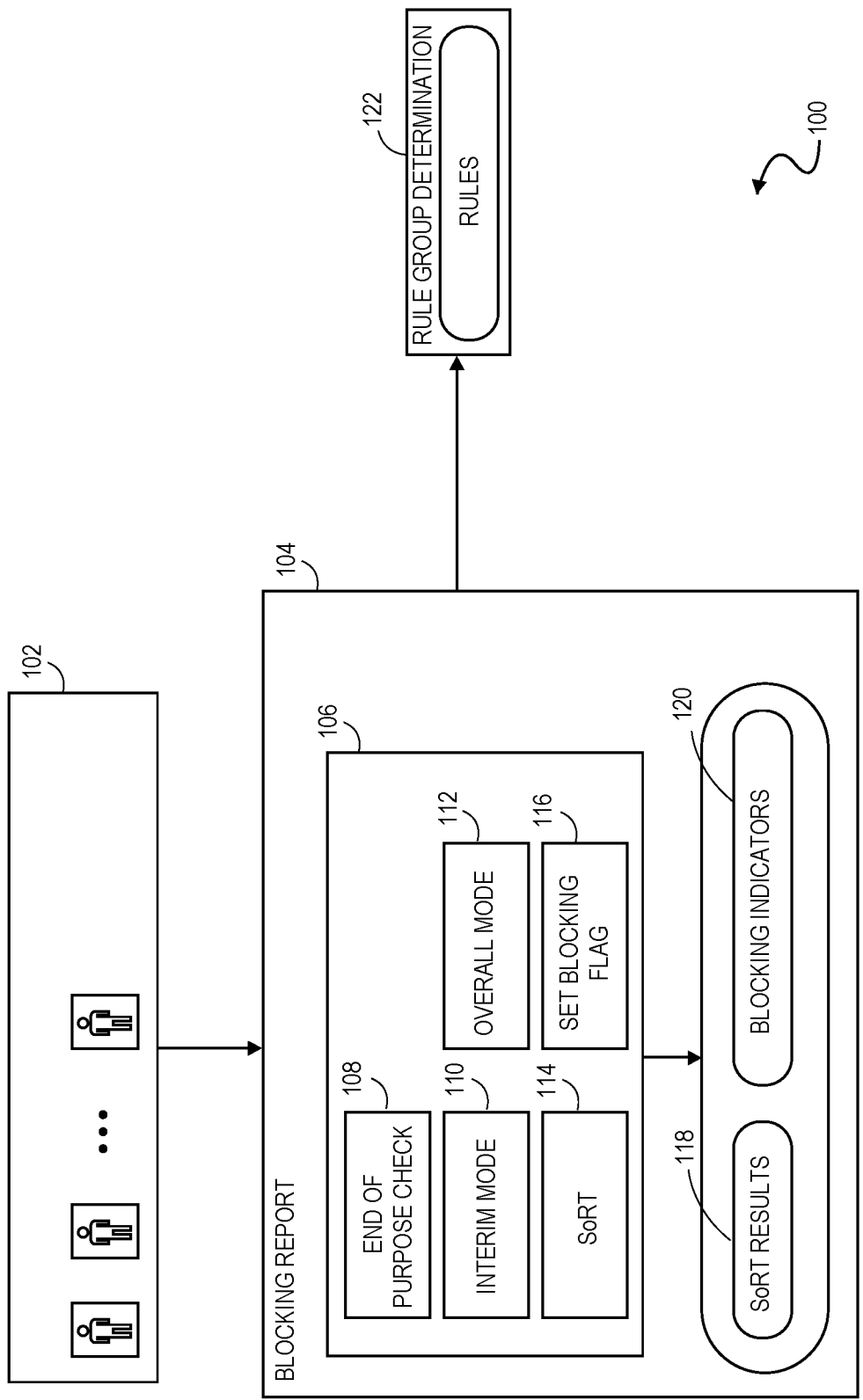
FIG. 1 illustrates an overview of data blocking for some embodiments.

The drawing figures do not limit the present teachings to the specific embodiments disclosed and described herein. The drawings are not necessarily to scale, emphasis instead being placed upon clearly illustrating the principles of the disclosure.

DETAILED DESCRIPTION

The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the disclosed embodiments in sufficient detail to enable those skilled in the art to practice the present teachings. Other embodiments can be utilized, and changes can be made without departing from the claimed scope of the claims. The following detailed description is, therefore, not to be taken in a limiting sense. The scope of embodiments is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Systems and methods for data blocking for application platforms are disclosed herein. Data maintained by an application system may have a residence period during which the data may be used for various processing purposes. Once the residence period expires, the data may transition to a retention period wherein the data remains in the application platform but is to be blocked from further processing. To achieve compliance, such data should be inaccessible (i.e., blocked) to general users while still being accessible for specific use cases (e.g., auditing). Residence periods vary depending on the type of data and the purpose for the data. For example, an HR department may be required to store an employee's address for three years, while a payroll department may be required to store the address for five years. As such, after three years the data should be blocked for the HR department but not for the payroll department and, after five years, the data should be blocked for the payroll department as well. Data may be blocked within an application platform by preventing the display of the blocked data, preventing modifications to the blocked data, preventing the creation of an object comprising the blocked data, preventing copying or follow-up actions on the blocked data, preventing the searching of the blocked data, or any combination thereof. In some embodiments, users having special authorizations may have read-only access to the blocked data but may be restricted from performing any of the above-described actions on the blocked data.

Application platforms may comprise a plurality of systems. The systems may be enterprise resource planning systems, customer relationship management systems, supplier relationship management systems, or any other data management system and may comprise cloud and/or on-premises systems. Such systems may be categorized into leading systems and dependent systems. Leading systems may comprise one or more electronic master data entities. Dependent systems may comprise replications of the data entities from the leading system. A dependent system may comprise multiple data entities and may comprise data entities having dependencies on different leading systems. Additionally, dependent systems may also comprise leading master data entities having their own dependent systems. As such, issues may arise when data blocking in application systems having multiple leading systems.

Typically, application platforms achieve data blocking by assuming one leading system with the rest of the systems being considered dependent. Data blocking then starts at the leading system and iterates down through the dependent systems. However, within application platform landscapes, multiple leading systems and multiple dependent systems may coexist as previously described. Therefore, blocking data in such a manner may result in master data entities being missed and/or a poorly-optimized data blocking system. Further still, data blocking is often performed in an order determined by a connection type. For example, systems that are connected over TCP/IP protocols may be evaluated for data blocking first. If a system that is likely to prevent data blocking is connected using a different type of network service, for example, such a system may be evaluated later in the data blocking process, leading to poorly optimized data blocking because substantial resources may be wasted evaluating the TCP/IP systems first.

To overcome these limitations, systems in the application platform may be grouped into one or more system groups. Each system group may comprise one leading system and dependent systems thereof. Leading systems and dependent systems may be present in more than one system group. Once grouped, the system groups may be evaluated for data blocking by determining if an end of purpose for the system has been reached. If the end of purpose for a system in a system group has not been reached, data blocking may be prevented for all systems in the system group. Data blocking may be triggered from leading system to the dependent systems.

FIG. 1 illustrates a system overview 100 for data blocking in application platforms in some embodiments. Users 102 may be admin users 102 of the application platform having higher privileges than normal users or may be any other users. In some embodiments, users 102 are data privacy officers responsible for maintaining the privacy of data and ensuring all legal and corporate rules and regulations are adhered to. Users 102 may administer electronic blocking report 104 to initiate the data blocking process. Electronic blocking report 104 may comprise various processes 106 which may be configured for data blocking. Processes 106 may comprise an End of Purpose (EoP) check 108, an interim check 110, an overall check 112, start of retention time (SoRT) 114, a blocking flag 116, or any combination thereof. Processes 106 may comprise the data blocking evaluation performed for the application platform.

EoP check 108 may comprise a test to determine if the data for a system can be blocked. As described above, data may have a defined residence period after which the data is to be blocked. EoP check 108 may be configured by user 102 to scan the systems manually, on a periodic basis, or based off any other triggering event. In some embodiments, EoP check 108 may be configured to scan the systems at differing levels of the application platform. For example, for a hierarchical database system, EoP check 108 may begin the scan at the third level of the hierarchy and not scan the first and second levels. Alternatively, or additionally, EoP check 108 may scan the application platform for specific systems specified by user 102. EoP check 108 may flag any system having reached the end of the defined residence period. In some embodiments, EoP check 108 flags any system that will reach the end of the defined residence period prior to the next scheduled EoP check 108.

EoP check 108 may leverage SoRT 114 when determining if a system may be blocked. SoRT 114 may designate the end of processing for data in a system. For example, the completion of a document may be the end of processing for the data and, as such, the start of retention time 114. SoRT 114 may be stored in a database or table and retrieved by end of purpose check 108 when determining if the residence period has expired. In some embodiments, SoRT 114 is sent to the leading system of the system group such that the leading system may only block data for those dependent systems having reached their end of purpose as determined by SoRT 114. For a system that is determined to have its residence period expired, a blocking flag 116 may then be set to indicate that the data for the system should be blocked.

Interim check 110 may comprise an interim blocking mode for electronic blocking report 104. Interim checks 110 may be performed after the systems have been grouped into system groups. Interim checks 110 may be performed locally on a specified dependent system. The interim check 110 may comprise evaluating blocking on the dependent system by performing EoP check 108. Thereafter, SoRT results 118 may be transmitted to the leading system of said dependent system as described below. The blocking results may indicate whether a system should have data blocked therefor. In some embodiments, a blocking flag 116 is set to indicate that the associated system should be blocked. In some embodiments, interim check 110 is performed iteratively on all system groups in the application platform. Alternatively, or additionally, interim check 110 may be performed on select system groups. Executing an interim check 110 is discussed in further detail with respect to FIG. 5.

Electronic blocking report 104 may also comprise overall check 112. Overall checks 112 may be performed after the creation of system groups and may comprise operating in an overall mode, wherein the actual data blocking is performed. Executing an overall check 112 is discussed in further detail with respect to FIG. 5.

Once processes 106 have been executed and data blocking is complete, electronic blocking report 104 may store SoRT results 118 and/or blocking indicators 120. SoRT results 118 may comprise the SoRT data stored in the database as described above. Blocking indicators 120 may comprise blocking flag 116 and may be stored with SoRT results 118 or separately from SoRT results 118. In some embodiments, blocking indicators 120 comprises an identifier for the leading system of the system group.

Electronic blocking report 104 may also be communicatively coupled to one or more rules engines 122. Rules engine 122 may comprise an API for defining and processing rules. The rules may be implemented as expressions which are assigned to a function. As described above, system groups may be created to facilitate data blocking for application platforms. System groups may be based off predefined and/or user-defined rules. Rules may be defined to indicate which system should be a leading system and which systems should be dependent systems thereof. In some embodiments, after designating a system as a leading system, a master data entity is created therefor. Rules may be defined based on various systems attributes associated with systems in the application platform. In some embodiments, users 102 create custom code extensions to define rules for rules engine 122.

The systems may comprise system attributes such as an identifier, a category, a grouping, a data controller, a data origin, a code, and the like. Various other custom attributes may be specified by user 102. System attributes may be dynamic, and the grouping rules may use the system attributes at runtime for generating system groups. In some embodiments, a system identifier attribute comprises a textual, numeric, or alphanumeric identifier or name of the system. In some embodiments, the system grouping attribute comprises a grouping by which systems are categorized. In some embodiments, systems may be grouped by their identifiers. As such, for example, systems having identifiers 2-10 may be placed in a first group, and systems having identifiers 12-20 may be placed in a second group. Therefore, user 102 may use rule engine 122 to define a rule that a system having an identifier of '1' is the leading system of the systems having identifiers 2-10, thus forming one system group. Similarly, a second system group may be formed with the system having identifier '11' as the leading system of systems having identifiers 12-20. It should be noted that groupings are not limited to numeric groupings, and may be grouped based off various other attributes, such as system categories.

In some embodiments, the system category attribute denotes a type of the system. For example, in an order processing database system, the system category may denote whether the system is for an individual, an organization, or a group of organizations or individuals. In some embodiments, the system code attribute may be any predefined (e.g., by the software vendor) or user-defined code for a system. For example, the system code may be a country, a company code, or any other identifier.

In some embodiments, the system data controller attribute indicates a user 102 in charge of said system. Alternatively, or additionally, the system data controller may be an organization in charge of the system. Thus, for example, rules may be created to ensure all systems controlled by a particular data controller are processed for data blocking. In some embodiments, the system data origin attribute indicates from where the data for system originated. Systems and/or data thereof may be received from various third-party or external sources. Creating a rule such that all systems having data originating from a particular source may allow for incoming data to be checked to ensure the data is available for processing.

Figure 2:
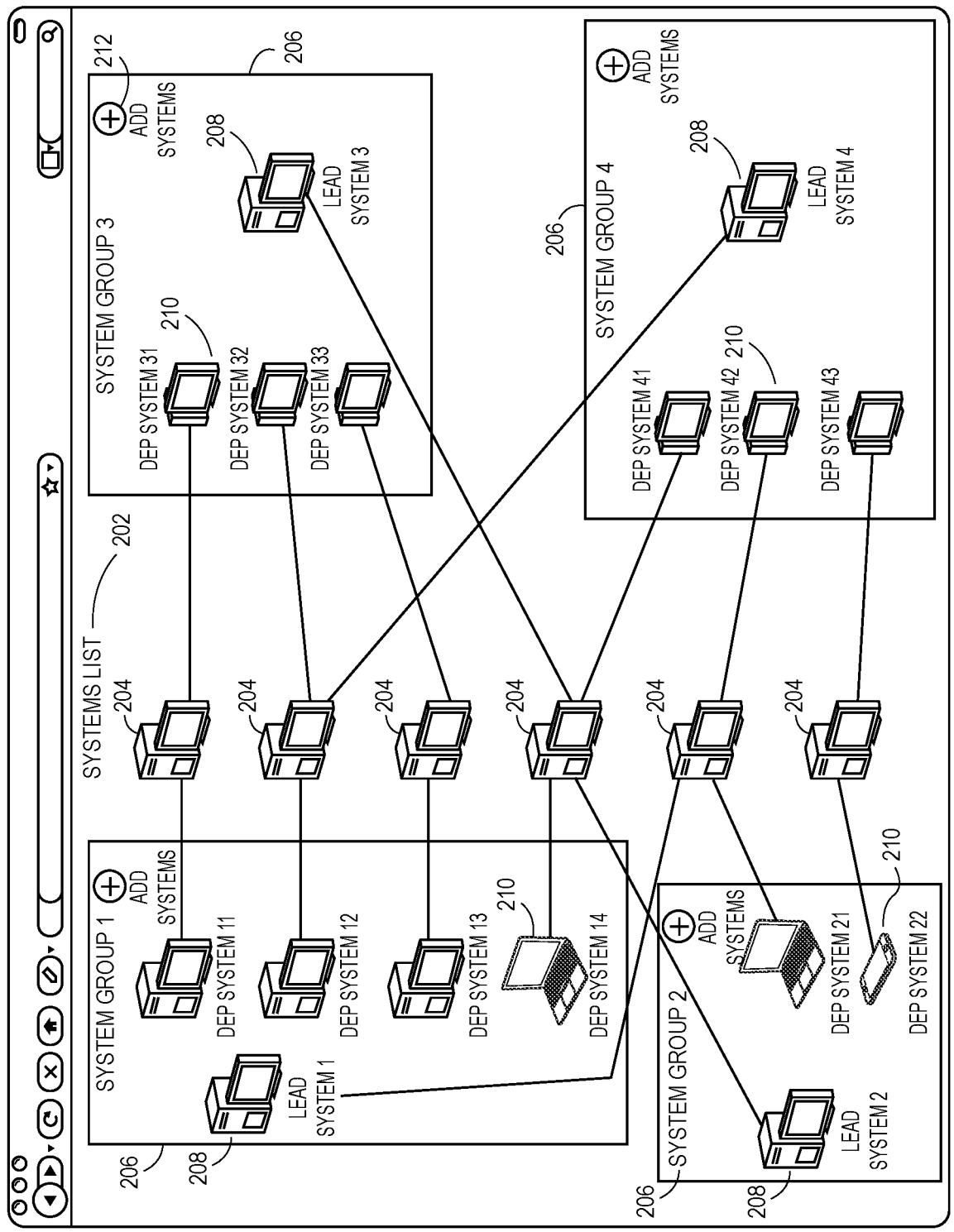
FIG. 2 illustrates a user interface for some embodiments.

FIG. 2 illustrates a user interface 200 for some embodiments. User interface 200 may be presented to a user 102 administering data blocking for the application platform. In some embodiments, user interface 200 comprises a systems list 202 comprising various systems 204. Systems 204 may be grouped into system groups 206, wherein a system group 206 may comprise a leading system 208 and zero or more dependent systems 210. Each system 204 in the application platform may be listed in systems list 202. As shown, a system 204 may be a leading system 208 in one system group 206 and a dependent system 210 in a second system group 206 within the application platform.

In some embodiments, user 102 may edit system groups 206 via user interface 200. Each system group 206 may have an associated modify control 212 for modifying the system group 206. Modify control 212 may allow user 102 to add, delete, promote, or demote a system 204 within the system group 206. In some embodiments, user interface 200 is configured with drag-and-drop functionality or other similar gestures for modifying systems 204 in system groups 206.

As described above, dependent systems 210 may comprise replications of master data entities stored in leading systems 208. In some embodiments, the creation of a master data entity leads to a creation of an associated data entity. For example, in a customer resource management system, a master data entity may be created representative of a company. Upon creation of the company master data entity, an associated data entity representative of a vendor for the company may also be created. When the company master data entity is replicated for a dependent system 210, the associated data entity may also be replicated. In some embodiments, the company master data entity may be replicated without the replication of the associated data entity. In some embodiments, the associated data entity is created and replicated in a dependent system 210 and omitted from the leading system 208. The associated data object may comprise roles for its master data entity. In some embodiments, the associated data object may be created in a leading system 208, and the master data entity may be created in a dependent system 210 thereof, referred to herein as a customer-vendor (CV) based-leading system.

As described above, system groups 206 may be formed based off rules defined via rules engine 122. In some embodiments, users 102 indicate a priority order in which a leading system 208 connects to its dependent systems 210. User 102 may set the priority order such that dependent systems 210 having a higher chance of vetoing data blocking are evaluated earlier in the data blocking process in order to prevent leading system 208 having to connect to each of its dependent systems 210. In some embodiments, user 102 can assign numbers to systems 204 such that the priority order follows the numerical order of the numbering. For example, user 102 may know that a first system 204 may have a longer residence period than any other system 204 in the systems list 202. As such, user 102 may assign this first system 204 number '1.' When first system 204 is a dependent system 210 in a system group 206, first system 204 will have EoP check 108 performed thereon first based off the priority order. Consequently, if the data blocking request is performed before the residence period for first system 204 has expired, the data blocking request may be vetoed because the data for first system 204 is still usable for further processing. In some embodiments, a veto of a system 204 in a system group 206 stops the evaluation of data blocking for all other systems 204 in the system group 206. In some embodiments, if a system 204 fails to block after data has been blocked for other systems 204 in the system group 206, the blocked data is rolled back to an unblocked state.

In some embodiments, customizable data for systems 204 is stored in a central system such that the customizable data may be distributed to systems 204 for reusability. In some embodiments, a process switch is provided for enabling data blocking with multiple leading systems. When the process switch is on, system groups 206 may be formed for data blocking. When the process switch is off, a standard data blocking process may be employed wherein a single leading system 208 is assumed with all other systems 204 being dependent systems 210. The position of the process switch may be stored as customizable data.

Various data for systems 204 may also be stored as customizable data. For example, names, descriptions, identifiers, attributes, or any combination thereof for systems 204 may be customizable data. Similarly, data for system groups 206 may be stored as customizable data. In some embodiments, customizable data for system groups 206 comprises the dependent systems 210 thereof, a group identifier, a group description, a default and/or specific connection type for connecting dependent systems 210 to leading system 208, a type of leading system 208, a connection type from leading system 208 to each dependent system 210, the priority order/sequence numbering for calling dependent systems 210, or any combination thereof. Further, rules defined in rules engine 122 for grouping systems 204 may be stored as customizable data. In some embodiments, the central system is a system 204 in systems list 202. Alternatively, or additionally, the central system is a separate system from systems 204. In some embodiments, the customizable data is read-only for systems 204 outside of the central system.

In some embodiments, configuration data for systems 204 is maintained in each system 204, and configuration data may vary between systems 204. In some embodiments, configuration data comprises various technical parameters for data blocking. As one example, the configuration data may comprise an indicator indicating which system 204 is the central system for maintaining the customizable data. Connection details for connecting leading systems 208 to their dependent systems 210 may also be stored. In some embodiments, systems 204 are connected to one another via function calls. The function calls may comprise a destination defining which system 204 to call. Alternatively, or additionally, systems 204 may connect over a data networking protocol such as TCP/IP and service port information may be maintained as configuration data across all systems 204. By utilizing the priority order as described above, the blocking process may be optimized because data blocking evaluation may be performed according to the priority rather than by connection type.

In some embodiments, the configuration data depends on whether data blocking is performed in interim check 110 or overall check 112. When operating in interim check 110, the configuration data for a system 204 may indicate if the system 204 is a dependent system 210 of the current system group 206 being processed. When operating in overall check 112, the configuration data for a system 204 may indicate if the system 204 is the leading system 208 of the current system group 206 being processed. The above-described customizable and/or configuration data may be used to render and maintain user interface 200. If either of the customizable or the configuration data is modified, the modification may be reflected in user interface 200.

Figure 3:
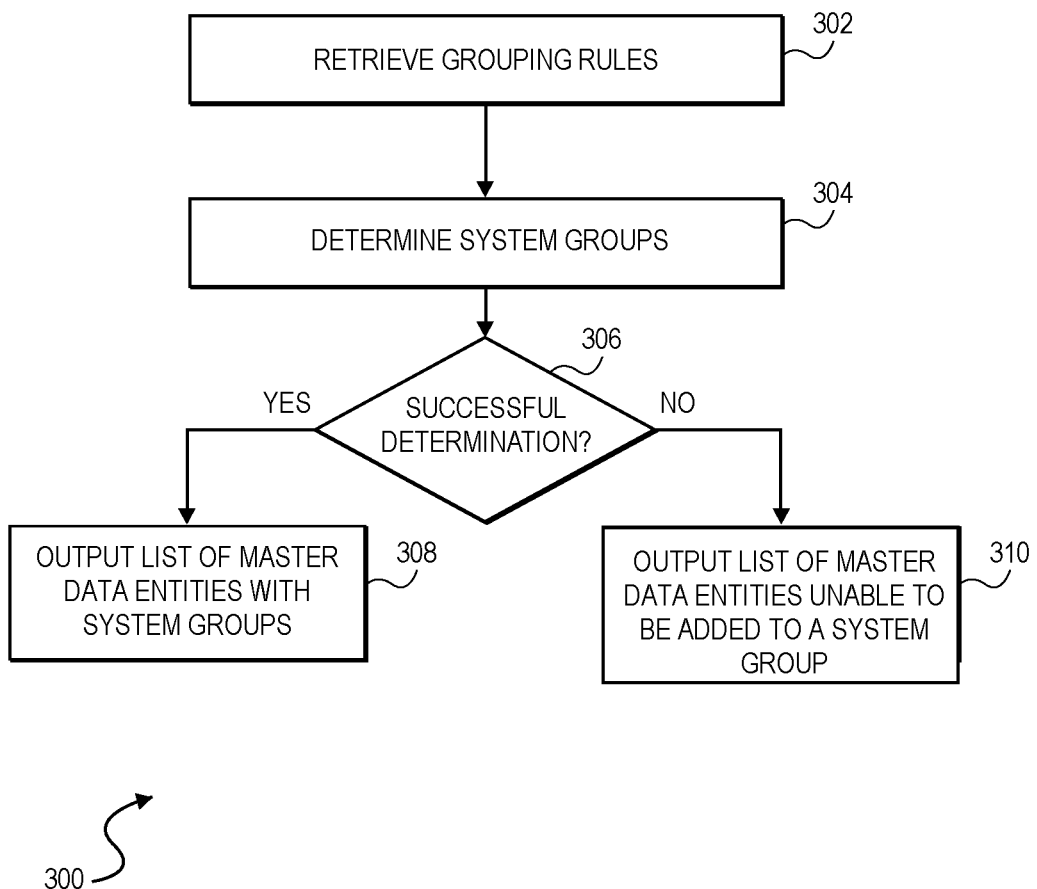
FIG. 3 illustrates an exemplary flow chart for generating electronic group coverage reports in accordance with some embodiments.

FIG. 3 illustrates an exemplary method 300 for generating electronic group coverage reports in some embodiments. The electronic group coverage report may be generated to determine if each system 204 and/or master data entity in the application platform has been assigned to at least one system group 206. In some embodiments, electronic group coverage reports may be generated automatically by data processing systems associated with one or more application platforms on a predefined basis. In some embodiments, electronic group coverage reports are generated responsive to user 102 requesting data blocking for the application platform. The electronic group coverage report may be displayed in user interface 200.

A step 302, the grouping rules may be retrieved. As described above, systems 204 may be grouped based on rules defined in rules engine 122. The grouping rules may define which systems 204 should be grouped together based on attributes of systems 204. In some embodiments, the attributes comprise a system identifier, a code, a system category, a system grouping, a system data controller, a system data origin, or the like for a system 204.

Next, at step 304, system groups 206 may be determined for the systems 204 in the application platform. At test 306, it may be checked whether the determination of system groups 206 for the application platform was successful. If the determination was successful, processing may proceed to step 308. If the determination was unsuccessful, processing may proceed to step 310. A successful determination may be indicated by each master data entity being assigned to at least one system group 206.

At step 308, for a successful determination of system groups 206 for the application platform, a list of master data entities and their associated system groups 206 may be generated for user 102. At step 310, for an unsuccessful determination of system group 206 for the application platform, a list of master data entities unable to be added to a system group 206 may be generated for user 102. As such, user 102 may be able to edit the rules in rules engine 122 to ensure all master data entities are able to be added to a system group 206. Thereafter, user 102 may run the electronic group coverage report again to ensure the new rules correctly group all master data entities.

Figure 4:
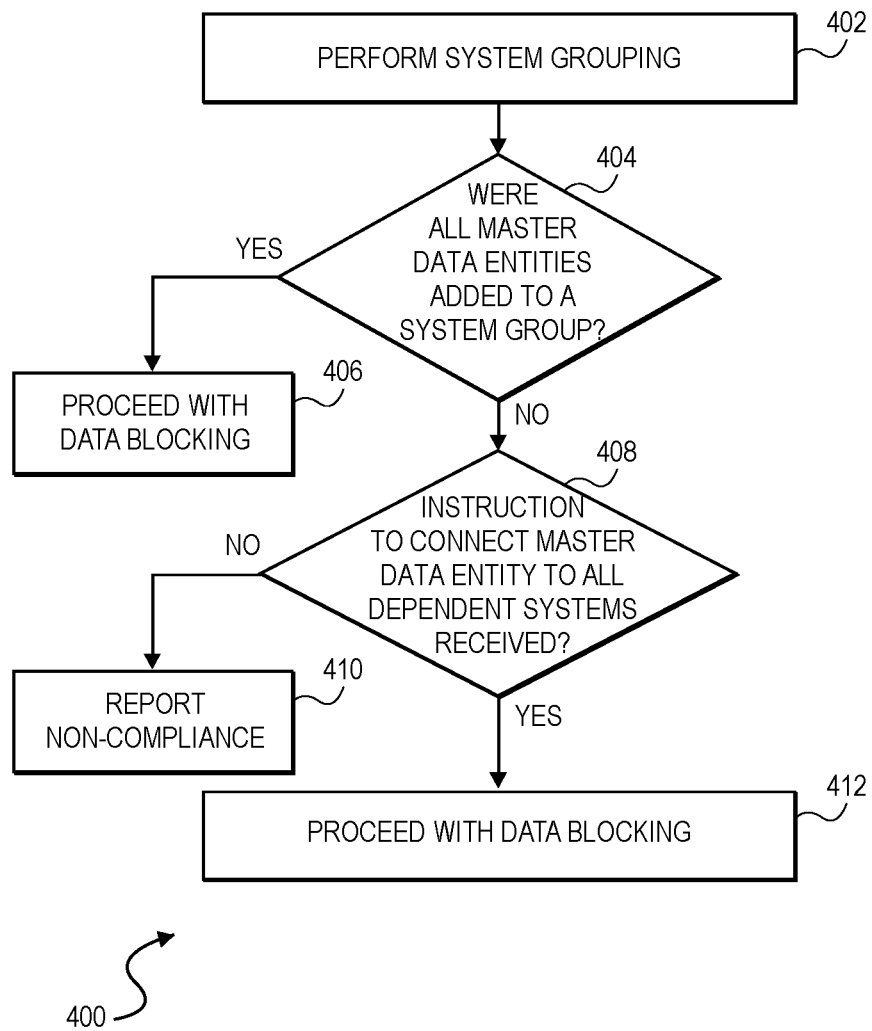
FIG. 4 illustrates an exemplary flow chart for generating electronic group exclusion reports in accordance with some embodiments.

Turning now to FIG. 4, an exemplary method 400 for generating an electronic group exclusion report is illustrated for some embodiments. The electronic group exclusion report may outline which (if any) systems 204 and/or master data entities may be skipped for data blocking due to a missing and/or non-unique determination of system group 206. In some embodiments, the electronic group exclusion report may be executed to ensure that any skipped master data entity is handled correctly when evaluated for data blocking. The electronic group exclusion report may be presented to user 102 via user interface 200.

At step 402, system grouping may be performed based on the rules as described above. Once system groups 206 are obtained, at step 404, it may be determined whether all master data entities were added to a system group 206. If all master data entities were correctly grouped, processing may proceed to step 406. At step 406, data blocking may proceed as outlined below with respect to FIG. 5.

If at least one master data entity was not correctly added to a system group 206, at step 408, it may be determined if an instruction to connect the incorrectly grouped master data entity to all dependent systems 210 in the application platform was received. In some embodiments, user 102 is prompted (e.g., via user interface 200) to confirm that the master data entity should be connected to all dependent systems 210 in the application platform. If the instruction is not received, processing may proceed to step 410. At step 410, user 102 may be alerted of non-compliance because there may be master data entities which have not been evaluated for data blocking and which may have data having an expired residence period.

If the instruction is received, at step 412, data blocking may proceed as discussed below with respect to FIG. 5. Performing data blocking by connecting the incorrectly grouped master data entity to all dependent systems 210 may be less efficient than by correctly forming system groups 206 but may still be considered compliant for data blocking.

Figure 5:
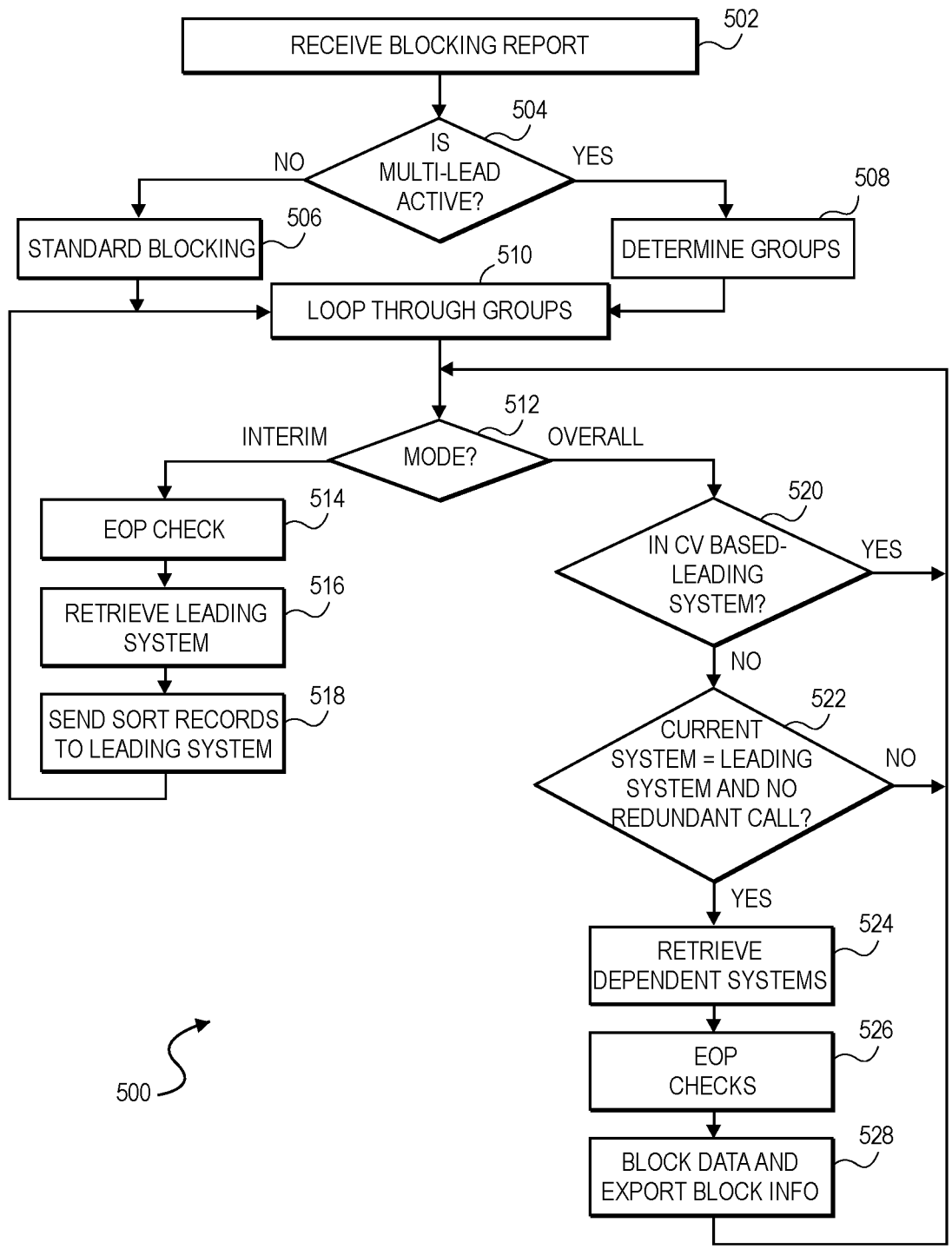
FIG. 5 illustrates an exemplary flow chart for data blocking for some embodiments.

Turning now to FIG. 5, an exemplary method 500 for data blocking for an application platform is illustrated for some embodiments. Processing may begin at step 502 where electronic blocking report 104 is received. As described above, electronic blocking report 104 may comprise various processes 106, such as end of purpose checks 108, interim checks 110, overall checks 112, SoRT 114, blocking flag 116, or any combination thereof. In some embodiments, processes 106 may be selected by user 102 for data blocking. For example, user 102 may select to execute overall check 112 via electronic blocking report 104. In some embodiments, only one of the interim check 110 or the overall check 112 may be chosen for electronic blocking report 104.

At step 504, a check may be performed to see if multi-lead is active. As described above, the application platform may have multiple leading systems 208 or may have a single leading system having multiple dependent systems 210 replicated therefrom. The above-described process switch may be used to determine if multi-lead is active. If multi-lead is active, processing may proceed to step 506. If multi-lead is not active, processing may proceed to step 508.

When multi-lead is not active, at step 506, the standard blocking solution may be employed. The standard blocking solution may assume an application platform having a single leading system 208 with all other systems 204 being dependent systems 210. Blocking may then be performed starting from the single leading system 208 and iterating through the dependent systems 210 thereof. In some embodiments, the leading system 208 in the standard blocking solution may call dependent systems 210 according to the priority list.

When multi-lead is active, at step 508, the system groups 206 may be determined. In some embodiments, the determination is based off the rules defined by user 102 and/or provided by a software vendor via rules engine 122. As described above, custom extensions may be provided by user 102 for determining system groups 206 of electronic master data entities. Each system group 206 may comprise a single leading system 208 and zero or more dependent systems 210. In some embodiments, systems 204 may be present in multiple system groups 206. In some embodiments, a system 204 may be a leading system 208 of a first system group 206 and a dependent system 210 of a second system group 206. At step 510, the first system group 206 in the plurality of system groups may be iterated through in either interim mode or overall mode, as discussed below.

Thereafter, at step 512 the blocking mode may be checked. As described above with respect to FIG. 1, blocking may be performed in an interim mode or an overall mode. In some embodiments, the interim mode is used as a test mode, wherein it is determined which systems 204 need to have their data blocked, i.e., which systems 204 have expired residence periods. The overall mode may comprise the actual blocking for the systems 204. It should be noted that the overall mode may be ran without first executing the interim mode. If the blocking mode is the interim mode, processing may proceed to step 514. If the blocking mode is the overall mode, processing may proceed to step 520.

At step 514, data blocking may be executed in interim mode after performing an EoP check 108. In some embodiments, the EoP check 108 is a local EoP check 108 such that the EoP check 108 is only performed on non-remote systems 204. Thereafter, at step 516, the leading system 208 of the system group 206 may be retrieved. In some embodiments, the dependent system 210 stores an identifier of the leading system 208 as customizable data. Additionally, connection information for connecting to leading system 208 may be stored by dependent system 210 as described above. As such, the dependent system 210 may use the identifier and connection information to connect to leading system 208. At step 518, SoRT results 118 may be sent to leading system 208. Therefore, leading system 208 may know which dependent systems 210 should have their data blocked once data blocking is executed in the overall mode. Subsequently, processing may return to step 510 for processing the next system group 206.

When executing in overall mode, processing may proceed from step 512 to step 520. At step 520, a check may be made to determine if the systems 204 in the system group 206 are operating in a CV based-leading system. A CV based-leading system may be a system group 206 in which a master data entity is a dependent system 210 of the associated data entity. The creation of the associated data entity in a leading system 208 may lead to the creation of a master data entity in a dependent system 210. In a CV based-leading system, the master data entity may be replicated from the associated data entity. If the system group 206 is operating in the CV based-leading system, processing may proceed back to step 512 until the leading system 208 is not operating in a CV based-leading system. In some embodiments, the grouping rules may be modified to ensure the leading system 208 is not the CV based-leading system to operate in the overall mode. If the systems 204 are not operating in the CV based-leading system, processing may proceed to step 522.

At step 522 a determination may be made to ensure that the current system 204 is the leading system 208 of the system group 206. As described above, data blocking may be triggered from leading system 208 to dependent systems 210 according to the priority order. Further, it may be checked that no redundant call of the system 204 has been made to prevent systems 204 from being evaluated multiple times for data blocking. If the current system 204 is not the leading system 208 of the system group 206 and/or a redundant call has been made, processing may proceed back to step 512. If the conditions of step 522 are satisfied, processing may proceed to step 524.

At step 524, the dependent systems 210 of the system group 206 may be retrieved. Thereafter, at step 526, system group 206 may be iterated through and EoP checks 108 executed. In some embodiments, the EoP checks 108 are performed on both remote and local systems 204. Thereafter, for systems 204 having expired residence periods, the data may be blocked therefor at step 528. Additionally, blocking information for the blocked data may be exported and stored. In some embodiments, the blocking information comprises the blocking indicators 120 and/or an identifier for leading system 208. In some embodiments, the blocking information is stored in a persistency layer of the application platform.

Figure 6:
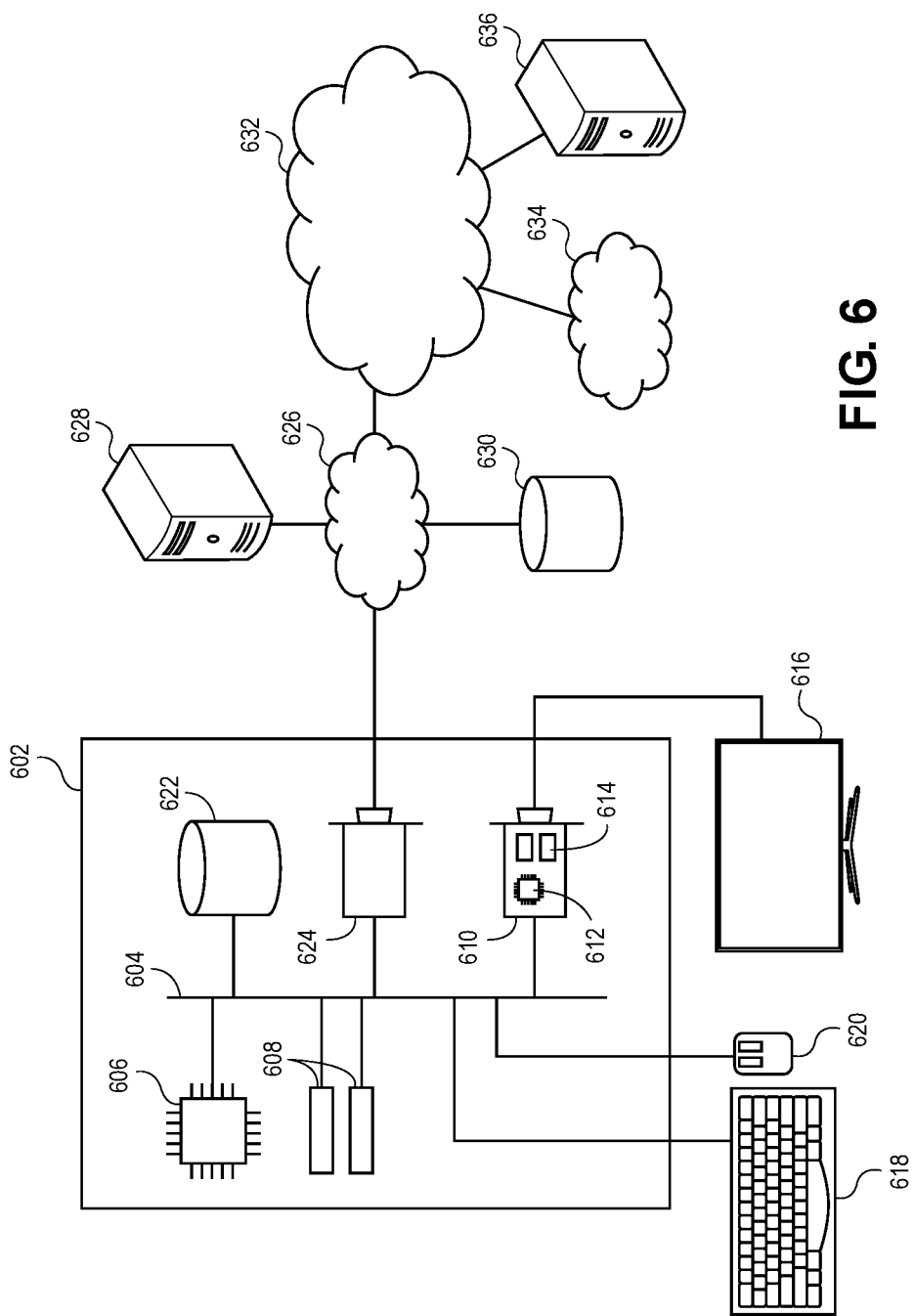
FIG. 6 depicts an exemplary hardware platform for some embodiments.

Turning now to FIG. 6, in which an exemplary hardware platform for certain embodiments is depicted. Computer 602 can be a desktop computer, a laptop computer, a server computer, a mobile device such as a smartphone or tablet, or any other form factor of general- or special-purpose computing device containing at least one processor. Depicted with computer 602 are several components, for illustrative purposes. In some embodiments, certain components may be arranged differently or absent. Additional components may also be present. Included in computer 602 is system bus 604, via which other components of computer 602 can communicate with each other. In certain embodiments, there may be multiple busses or components may communicate with each other directly. Connected to system bus 604 is central processing unit (CPU) 606. Also attached to system bus 604 are one or more random-access memory (RAM) modules 608. Also attached to system bus 604 is graphics card 610. In some embodiments, graphics card 610 may not be a physically separate card, but rather may be integrated into the motherboard or the CPU 606. In some embodiments, graphics card 610 has a separate graphics-processing unit (GPU) 612, which can be used for graphics processing or for general purpose computing (GPGPU). Also, on graphics card 610 is GPU memory 614. Connected (directly or indirectly) to graphics card 610 is display 616 for user interaction. In some embodiments no display is present, while in others it is integrated into computer 602. Similarly, peripherals such as keyboard 618 and mouse 620 are connected to system bus 604. Like display 616, these peripherals may be integrated into computer 602 or absent. Also connected to system bus 604 is local storage 622, which may be any form of computer-readable media, such as non-transitory computer readable media, and may be internally installed in computer 602 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 624 is also attached to system bus 604 and allows computer 602 to communicate over a network such as network 626. NIC 624 can be any form of network interface known in the art, such as Ethernet, ATM, fiber, Bluetooth, or Wi-Fi (i.e., the Institute of Electrical and Electronics Engineers (IEEE) 802.11 family of standards). NIC 624 connects computer 602 to local network 626, which may also include one or more other computers, such as computer 628, and network storage, such as data store 630. Generally, a data store such as data store 630 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein such as backup or versioning. Data stores can be local to a single computer such as computer 628, accessible on a local network such as local network 626, or remotely accessible over public Internet 632. Local network 626 is in turn connected to public Internet 632, which connects many networks such as local network 626, remote network 634 or directly attached computers such as computer 636. In some embodiments, computer 602 can itself be directly connected to public Internet 632.

Many different arrangements of the various components depicted, as well as components not shown, are possible without departing from the scope of the claims below. Embodiments have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the present teachings have been described with reference to the embodiments illustrated in the attached drawing figures, it is noted that equivalents may be employed and substitutions made herein without departing from the scope of the claims.

Having thus described various embodiments, what is claimed as new and desired to be protected by Letters Patent includes the following:

1. One or more non-transitory computer-readable media storing computer-executable instructions that, when executed by a processor, perform operations for data blocking for application platforms, the operations comprising:
   receiving, from a user, a blocking request to block data in an application platform, the application platform comprising a plurality of systems, including at least two leading systems containing original versions of electronic master data entries and one or more dependent systems containing replications of the electronic master data entries;

responsive to the receiving the blocking request, grouping the plurality of systems into a plurality of system groups so that no single system group contains more than one leading system, determining, for a first system group of the plurality of system groups, that a residence period has expired for the leading system in the first system group and for at least one dependent system in the first system group; and responsive to the determining, blocking data on the leading system in the first system group and the at least one dependent system in the first system group such that the data is unavailable for processing.

2. The media of claim 1, the operations further comprising:

receiving, from the user, at least one rule for the first system group, wherein the at least one rule comprises an attribute defining an electronic master data entity as the leading system for the first system group.

3. The media of claim 2, wherein the attribute is a first attribute, and wherein the at least one rule further comprises a second attribute defining the electronic master data entity as a dependent system for the first system group.

4. The media of claim 1, the operations further comprising:

receiving, from the user, a priority order for each system in the plurality of systems, wherein determining if the residence period has expired is performed according to the priority order.

5. The media of claim 4, the operations further comprising:

responsive to determining that the residence period has not expired, preventing the blocking of the data for the first system group.

6. The media of claim 1, the operations further comprising:

exporting a set of blocking data, the set of blocking data comprising blocking indicators for the plurality of systems.

7. A method for data blocking for application platforms, the method comprising:

receiving, from a user, a blocking request to block data in an application platform, the application platform comprising a plurality of systems, including at least two leading systems containing original versions of electronic master data entries and one or more dependent systems containing replications of the electronic master data entries;

responsive to the receiving the blocking request, grouping the plurality of systems into a plurality of system groups so that no single system group contains more than one leading system, determining, for a first system group of the plurality of system groups, that a residence period has expired for the leading system in the first system group and for at least one dependent system in the first system group; and responsive to the determining, blocking data on the leading system in the first system group and the at least one dependent system in the first system group such that the data is unavailable for processing.

8. The method of claim 7, wherein the interim test check comprises:

performing an end of purpose check for each dependent system in the first system group;

connecting each dependent system to the leading system; and transmitting a result of the end of purpose check from each dependent system to the leading system.

9. The method of claim 7, wherein the data blocking of the application platform comprises:

determining, for a first system group of the plurality of system groups that a residence period has expired for the leading system in the first system group and for at least one dependent system in the first system group; and responsive to determining, blocking data on the leading system in the first system group and the at least one dependent system in the first system group such that the data is unavailable for processing.

10. The method of claim 7, further comprising:

receiving, from the user, a request to generate an electronic group exclusion report for the application platform;

responsive to receiving the request, determining if a first electronic master data entity was not added to a system group of the plurality of system groups.

11. The method of claim 10, further comprising:

responsive to determining the first electronic master data entity was not added to the system group of the plurality of system groups, connecting the system to each dependent system in the application platform.

12. The method of claim 7, further comprising:

receiving, from the user, a request to generate an electronic group coverage report for the application platform; and responsive to receiving the request, determining if a first electronic master data entity is in a system group of the plurality of system groups.

13. The method of claim 12, further comprising:

responsive to determining that the first electronic master data entity is not in the system group of the plurality of system groups, alerting the user.

14. A system for data blocking for application platforms, the system comprising:

a data store;

a processor; and one or more non-transitory computer-readable media storing computer-executable instructions that, when executed by the processor, perform operations for data blocking for application platforms with multiple leading systems, the operations comprising:

receiving, from a user, a blocking request to block data in an application platform, the application platform comprising a plurality of systems, including at least two leading systems containing original versions of electronic master data entries and one or more dependent systems containing replications of the electronic master data entries;

responsive to the receiving the blocking request, grouping the plurality of systems into a plurality of system groups so that no single system group contains more than one leading system, determining, for a first system group of the plurality of system groups, that a residence period has expired for the leading system in the first system group and for at least one dependent system in the first system group; and responsive to the determining, blocking data on the leading system in the first system group and the at least one dependent system in the first system group such that the data is unavailable for processing.

15. The system of claim 14, wherein the operations further comprise providing a user interface displaying the first system group.

16. The system of claim 15, wherein the operations further comprise receiving, in the user interface, an input for editing the first system group, the input comprising one of an addition or a removal of a dependent system for the first system group.

17. The system of claim 15,
wherein each system of the plurality of systems comprises a set of configurable data, and
wherein the operations further comprise:
generating the user interface based on the set of configurable data.

18. The system of claim 14,
wherein the first system group is determined based on at least one rule,
wherein the at least one rule defines an attribute indicative that an electronic master data entity is grouped into the first system group.

19. The system of claim 18, wherein the attribute comprises one of an electronic master data entity identifier or an electronic master data entity category.

* * * * *